United States Patent [19]

Hopkins et al.

[11] 4,334,415
[45] Jun. 15, 1982

[54] UNIVERSAL COUPLING SPIDER BEARING AND YOKE

[75] Inventors: Michael F. Hopkins, Aurora; Alvin D. Mayerchin, Oswego, both of Ill.

[73] Assignee: Caterpillar Tractor Co., Peoria, Ill.

[21] Appl. No.: 165,832

[22] PCT Filed: Jan. 28, 1980

[86] PCT No.: PCT/US80/00083
§ 371 Date: Jan. 27, 1980
§ 102(e) Date: Jan. 27, 1980

[87] PCT Pub. No.: WO81/02187
PCT Pub. Date: Aug. 6, 1981

[51] Int. Cl.³ .................................................. F16D 3/40
[52] U.S. Cl. .................................................. 464/130
[58] Field of Search .............. 64/17 R, 17 A, 17 SP

[56] References Cited

U.S. PATENT DOCUMENTS

| | | | |
|---|---|---|---|
| 1,371,005 | 3/1921 | Thiemer | 64/17 R |
| 1,583,184 | 5/1926 | Sandberg | 64/17 SP |
| 2,698,527 | 1/1955 | Anderson | 64/17 A |

FOREIGN PATENT DOCUMENTS 2006923  5/1979  United Kingdom ............... 64/17 R

*Primary Examiner*—Tony M. Argenbright
*Attorney, Agent, or Firm*—Wegner, Stellman, McCord, Wiles & Wood

[57] ABSTRACT

A universal coupling (40) for joining two rotatable shafts (42,43) in driving relation includes a pair of opposed yoke members (48,49) connected together by a multi-legged spider element (51). The ends of the spider legs (52) are journaled within bearing caps (60) which are secured to yoke flanges (56) by bolts (67). Each of the caps carry a pair of tapered keys (70) which seat in a pair of keyways (71) defined in the yoke flanges when the caps are fixed thereto. The keys (70) and keyways (71) are aligned on the bores (64,65) through which the securing bolts extend.

7 Claims, 3 Drawing Figures

U.S. Patent  Jun. 15, 1982  4,334,415
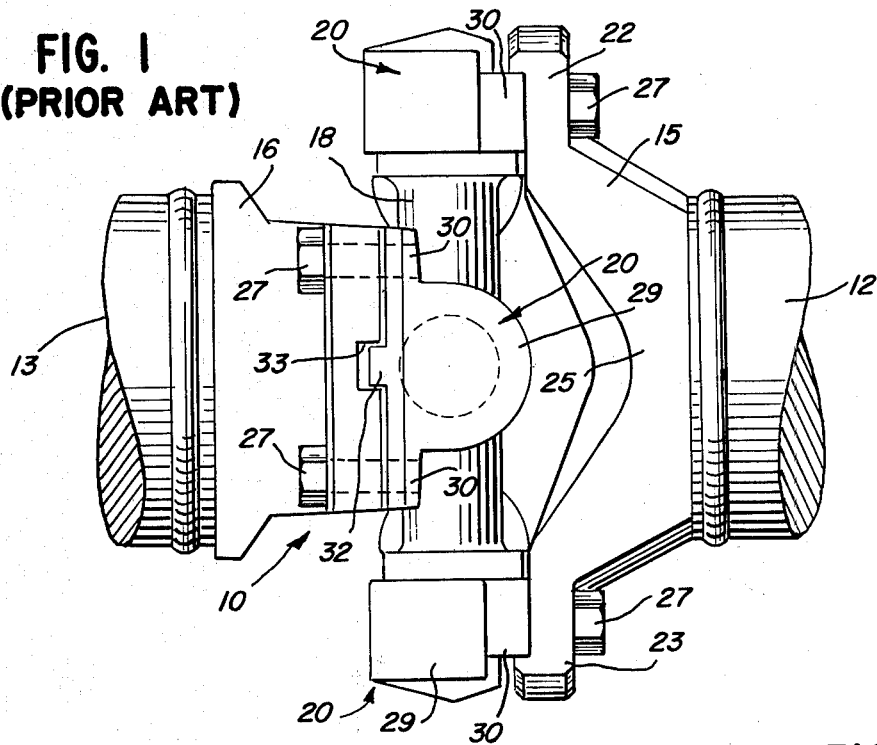
FIG. 1 (PRIOR ART)
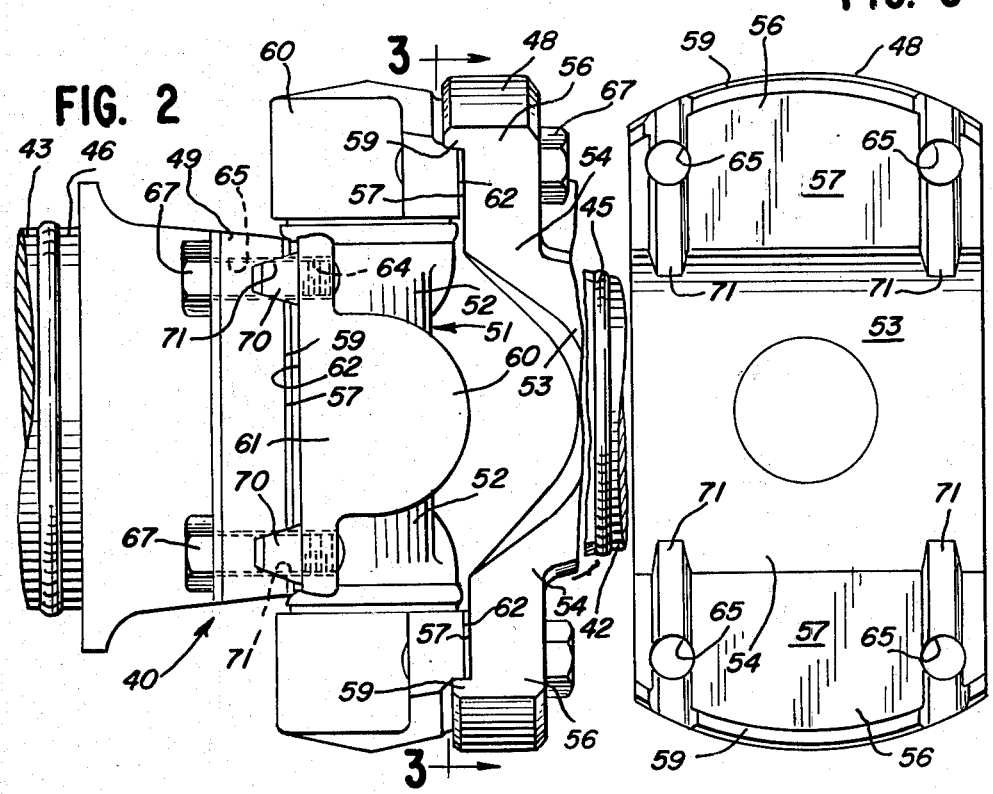
FIG. 2
FIG. 3

UNIVERSAL COUPLING SPIDER BEARING AND YOKE

DESCRIPTION

1. Technical Field

This invention relates to a universal coupling construction and, more particularly, to an improved spider bearing and yoke assembly.

2. Background Art

Articulated couplings for connecting a pair of rotatable shafts set at an angle to one another are generally well-known. One type of articulated coupling is a universal joint which allows for rotation in three planes similar to that commonly known as a Hooke's joint. Such a joint permits one shaft to be rotatively driven by a second shaft through the universal coupling even though the shafts are not co-linearly arranged or even though the angle between the respective rotational axes of the shafts may change as the shafts are rotated.

A universal coupling of the above-mentioned type includes a multi-legged spider. The free ends of the spider legs are journaled within yokes carried by each of the rotatable shafts at their respective opposed ends. Typically, spider caps are anchored to the yoke and carry bearings or bushings to reduce rotational friction between the spider and the yoke. In conventional spider and yoke couplings, the spider caps are attached to the yoke by a plurality of bolts. Since the number and size of the securing bolts are usually not great enough to produce a large clamping force, driving keys are required to transmit driving torque between the rotating shafts. In the prior art, a spider cap is constructed with a single square driving key which is fitted into a slot defined in the yoke.

In applications where torque reversals do not occur, this construction is sufficient. However, in those applications where torque reversals do occur, relative motion may take place between the spider cap and the yoke to which it is anchored because of clearances between the driving key and the slot. This relative motion can cause fretting between the mating surfaces of the parts thereby resulting first in bolt loosening due to loss of preload and then in the ultimate failure of the spider cap connection and of the coupling itself.

DISCLOSURE OF INVENTION

The present invention is directed to overcoming one or more of the problems as set forth above.

To overcome the problems associated with the prior art constructions without substantially increasing the cost of the coupling, tapered driving key and keyway combinations are employed between each spider bearing cap and yoke.

In accordance with the invention, a coupling having a spider element with legs journaled within spider caps carried by yokes at the ends of two opposed rotatable shafts includes a pair of tapered key and keyway combinations between the yokes and the respective spider caps mounted thereto. In an exemplary embodiment, the keys are carried by the spider caps and the keyways are defined in the yokes. The tapered keys and keyways eliminate relative motion between the yoke and the spider caps and distribute high torque and shear stresses over two keys and keyways. The keys and keyways are particularly effective on couplings subjected to torque reversals.

In one aspect of the invention, the keys and keyways are positioned along the centerlines of the bolts which secure the spider caps to the yokes, so that the bolts can be tightened to any desired preload without distortion of the parts.

In another aspect of the invention, the keyways are slightly smaller than the keys so that a full seat can be attained between the respective keys and keyways without the necessity of close tolerances being maintained.

BRIEF DESCRIPTION OF DRAWINGS

FIG. 1 is an elevational view of a spider and yoke coupling constructed in accordance with the prior art;

FIG. 2 is an elevational view of a spider and yoke coupling constructed in accordance with the present invention; and FIG. 3 is a plan view of the face of one of the yokes looking in the direction of the arrows 3—3 of FIG. 2.

BEST MODE FOR CARRYING OUT THE INVENTION

Referring to FIG. 1, a coupling, broadly designated 10, utilizing a prior art method of construction is illustrated. Therein, two rotatable shafts 12 and 13 have opposed Y-shaped yoke members 15 and 16, respectively. The yoke members 15 and 16, which are oriented 90° relative to one another, are drivingly interconnected by means of a multi-legged spider element 18. The yoke members 15 and 16 and the cross-shaped spider element 18 thereby define a universal coupling joint somewhat similar to a Hooke's joint.

The yoke members 15 and 16 are similarly constructed and each supports a pair of spider caps 20. As seen with respect to the right-hand yoke member 15, one spider cap 20 is secured to each yoke mounting portion 22 and 23 at oppositely spaced ends of the yoke body portion 25. The mounting portions 22 and 23 extend radially outward relative to the rotational axis of the shaft 12. The spider caps 20, each having a bearing or bushing (not shown) for journaling one leg of the spider element 18, are fixed by conventional means, such as bolts 27, to the mounting portions 22 and 23.

As seen with reference to the spider cap 20 attached to the yoke member 16 of the left-hand shaft 13, each spider cap 20 has a hub portion 29 and a pair of laterally opposed flange portions 30 extending outward from the hub portion 29. For each spider cap 20, two bolts 27 extend through the mounting portion 22 and 23 and are threaded one into each spider cap flange portion 30 at opposite sides of each hub portion 29. Each spider cap 20 also includes a single squared or rectangular driving key 32 extending axially from the hub portion 29. The driving key 32, when the spider cap 20 is properly bolted to the yoke member 15 or 16 protrudes into a slot or keyway 33 of squared or rectangular configuration defined along the centerline of the yoke member 15 or 16.

Referring to FIGS. 2 and 3, a coupling, broadly designated 40, incorporating the spider bearing and yoke assembly of the present invention is illustrated. As with the prior art construction shown in FIG. 1, two rotatable shafts 42 and 43 have opposed ends 45 and 46 carrying Y-shaped yoke members 48 and 49, respectively. The yoke members 48 and 49 are interconnected through a multi-legged spider element 51 in a manner described hereafter.

Since each of the yoke members 48 and 49 is similarly constructed, for purposes of brevity and clarity, only one yoke member will be described in detail. The yoke member 48, see FIGS. 2 and 3, has a body portion 53 secured by suitable means (not shown) colinearly with the shaft 42 and has laterally extending leg portions, each designated 54 and including a mounting flange 56. Each of the mounting flanges 56 has an axially outward flat mounting surface 57 which is perpendicular to the rotational axis of the shaft 42 and terminates in an outer abutment 59.

Four spider bearing caps, all of which are designated 60 and are of similar construction, include bearings or bushings (not shown) which journal the respective end of one of the four legs of the cross-shaped spider element 51, all of the spider legs being designated 52. Oppositely disposed legs 52 of the spider element 51 extend across each yoke member 48 or 49 and are journaled by the spider caps 60 for rotation along an axis extending therebetween. Each of the spider caps 60 has a body portion 61 with a flat bottom face 62 which will be located in fronting relation with the mounting surface 57 of the yoke mounting flange 56.

As seen with reference to the yoke member and spider cap associated with the rotatable shaft 43, bolt-receiving bores 64 are defined in the spider cap 60 and extend axially inward from the bottom face 62. One bore 64 is located on each lateral side of the journaling portion of the spider cap 60. Bolt-mounting bores 65 are defined through each of the mounting flanges 56 of the yoke member 49 and are spaced from the rotational axis of the shaft 43 along a lateral line across the flange. The bolt-mounting bores 65 permit the threaded shanks of bolts 67 to be inserted through the mounting flange 56 and threaded into the spider cap 60.

A pair of tapered driving keys 70 are carried integrally by each of the spider caps 60 and extend axially outward from the bottom face 62. Each key 70 tapers axially outward and thus is wider at the base adjacent the bottom face 62 than at the outward end. The tapered keys 70 are respectively aligned along the centerline of the bolt-receiving bores 64 spaced from the spider journal.

A pair of tapered slots or keyways 71 are defined in the axial outward mounting surfaces 57 of the mounting flange 56 and are aligned along the centerline of the bolt-mounting bores 65. The keyways 71 taper axially inward and thus are wider across their opening at the axial face than at their bottom. Although the keys 70 and keyways 71 are generally of similar cross-sectional configuration and are adapted for cooperative engagement with one another, the keyways 71 have a cross-sectional size which is slightly smaller than the cross-sectional size of the keys 70.

During assembly of the universal coupling 40, a spider cap 60 will be positioned on the end of each of the spider legs 52. The spider caps 60 can then be located adjacent the yoke-mounting flanges 56 with the bottom face 62 of the spider cap 60 in face-to-face relationship with the mounting surface 57 of the mounting flange 56 and the spider cap 60 and mounting flange 56 being aligned. In this position, the keys 70 and keyways 71 will also be placed in axial alignment with the keys 70 extending axially toward the keyways 71. Thereafter, the bolts 67 are inserted through the bolt-mounting bores 65 of the yoke member 48 or 49 and screwed into the bolt-receiving bores 64 in the spider cap 60. As the bolts 67 are tightened, the spider cap 60 will be moved toward the yoke member 48 or 49 to draw the key and keyway combination together in fixed relation.

When the bolts 67 are tightened to attain a predetermined preload, the keys 70 will frictionally seat within the keyways 71. Since the keys 70 and keyways 71 do not interfit completely, there will be a gap 73 defined between the axial mounting surface 57 of the mounting flange 56 and the bottom face 62 of the spider cap 60. The gap 73 does not adversely affect the structural integrity of the connection between the yoke member and the spider cap.

The tensile force of the bolts 67 is transmitted to the parts so that a force is exerted between the respective mating tapered surfaces of the key 70 and the keyway 71, thereby resulting in a substantial frictional force. Since the spider cap 60 is fixed to the yoke member 48 or 49 against relative movement, torque is transmitted from one shaft through the key 70 and keyway 71 to the other shaft to effect rotation thereof.

INDUSTRIAL APPLICABILITY

It can be appreciated that the above-described coupling having a spider-type connection may be employed in line with drive shafts, steering columns and the like, with advantageous results. The tapered design allows a full seat and thus eliminates relative motion between parts and the resultant loosening of the connection between parts. The placement of the key and keyway along the bolt centerlines allows the bolts to be tightened to any desired preload without distortion of the bolts of the joined parts.

Thus, the problem of maintaining clearance or low tolerances is avoided. In addition, high torque and shear stresses are distributed over at least two key and keyway combinations rather than one.

Other aspects, objects and advantages of this invention can be obtained from a study of the drawings, the disclosure and the appended claims.

We claim:

1. A spider bearing and yoke assembly (60,48,49) for a universal coupling (40) having a spider element (51) with plural legs (52) connecting two opposed rotatable shafts (42,43), the assembly comprising:
    a yoke (48,49) carried adjacent the opposed ends (45,46) of each of the shafts (42,43) and having spaced parts (54);
    a spider cap (60) located on each of said yoke parts (54) providing a journal for each leg (52) of the spider element (51);
    one of said spider caps (60) and yoke parts (54) having a tapered key (70) extending axially outward toward the mating spider cap (60) and yoke part (54);
    said mating spider cap (60) and yoke parts (54) defining a tapered keyway (71) adapted for cooperation with said key (70), said tapered keyway is smaller than said tapered key to prevent said key from moving completely into said keyway;
    said tapered key (70) and keyway (71) lying parallel to an axis of the leg (52) of the spider element (51) and being displaced radially outward from said axis; and
    securing means (67) for moving each of said spider caps (60) toward its respective yoke parts (54) to draw the spider cap (60) and yoke part (54) together into fixed axial relation, the tapers of said key (70) and keyway (71) being frictionally engaged to prevent relative radial and axial movement between the spider cap (60) and yoke part (54).

2. The assembly of claim 1 wherein a pair of keys (70,70) are carried by said one of said spider caps (60) and yoke parts (54) and a pair of keyways (71,71) are defined by said mating spider cap (60) and yoke part (54).

3. The assembly of claim 2 wherein said keys (70) are carried by the spider cap (60) and said keyways (71) are defined by the yoke parts (54).

4. The assembly of claim 3 wherein said securing means are bolts (67) extending through bores (65) defined through said yoke part (54) and into bores (64) defined in said spider cap (60), and said keys (70) and keyways (71) are aligned along the centerlines of said bores.

5. The assembly of claim 3 wherein said keys (70) are formed integral with said spider cap (60).

6. A spider bearing and yoke assembly (60,48,49) for a universal coupling (40) with a multi-legged spider element (51) connecting two rotatable shafts (42,43) having opposed ends (45,46), the assembly comprising:
- a yoke (48,49) carried adjacent the opposed ends (45,46) of each shaft (42,43) and having spaced parts (54) with mounting flanges (56) extending laterally from the rotational axis of its respective shaft, said mounting flanges (56) each having a pair of bolt-mounting bores (65), each bore (65) disposed generally along a centerline spaced from the rotational axis of the respective shaft;
- a spider cap (60) located on each mounting flange (56), each of said spider caps (60) providing a journal for one leg (52) of the spider element (51) and having a pair of bolt-receiving bores (64) one on either side of the spider journal and disposed generally along a centerline spaced from the spider journal and adapted to be aligned with said mounting bores (65);
- a plurality of bolts (67) extending respectively through the mounting bores (65) and into the receiving bores (64) for securing the spider caps (60) to their respective mounting flanges (56);
- a pair of tapered keys (70) extending axially outward from and aligned one along the centerline of each respective bolt-receiving bore (64);
- said pair of tapered keys aligning with each other along an axis radially spaced outward from the rotational axes of said shafts; and
- a pair of tapered keyways (71) defined in each mounting flange (56) aligned one along the centerline of each respective bolt-mounting bore (65) and having a cross-sectional size smaller than that of said tapered keys (70), said pair of tapered keyways aligning with each other along an axis radially spaced outward from the rotational axes of said shafts, whereby tightening of the bolts (67) aligns and secures the spider caps (60) to the respective yoke-mounting flanges (56) with the keys (70) frictionally seating partially within their respective keyways (71) for transmission of rotational torque between the shafts.

7. The assembly of claim 6 wherein said keys (70) are formed integral with said spider cap (60).

* * * * *